United States Patent [19]
Mahlein

[11] Patent Number: 4,760,569
[45] Date of Patent: Jul. 26, 1988

[54] INTEGRATED OPTICAL MULTIPLEX-DEMULTIPLEX MODULE FOR OPTICAL COMMUNICATIONS TRANSMISSION

[75] Inventor: Hans F. Mahlein, Unterhaching, Fed. Rep. of Germany

[73] Assignee: Siemens Aktiengesellschaft, Berlin and Munich, Fed. Rep. of Germany

[21] Appl. No.: 937,417

[22] Filed: Dec. 3, 1986

[30] Foreign Application Priority Data

Dec. 10, 1985 [DE] Fed. Rep. of Germany ....... 3543589

[51] Int. Cl.$^4$ .............................................. H04B 9/00
[52] U.S. Cl. .................................... 370/3; 350/96.11; 350/96.19; 455/606
[58] Field of Search ..................... 370/3, 1; 350/96.19, 350/96.11, 96.12, 96.15; 455/606, 607

[56] References Cited

U.S. PATENT DOCUMENTS 4,640,574 2/1987 Unger ................................ 350/96.11

FOREIGN PATENT DOCUMENTS 59-37520 3/1984 Japan ................................ 350/96.19

OTHER PUBLICATIONS

Unger, "Planar and Integrated Multi-and Demultiplexers", *Proceedings of the Sixth European Conference on Circuit Theory and Design*, Sep. 6-8, 1983, VDE-Verlag GmbH, Berlin, pp. 387-389.

Flanders et al., "Grating Filters for Thin-Film Optical Waveguides", *Applied Physics Letters*, vol. 24, No. 4, 15 Feb. 1974, pp. 194-196.

Tamir, "3. Beam and Waveguide Couplers", *Integrated Optics*, Springer-Verlag Berlin, Heidelberg, New York, 1975, pp. 83-135.

Flügge, *Encyclopedia of Physics*, vol. XXIX, Optical Instruments, Springer-Verlag, Berlin-Heidelberg-New York, 1967, pp. 564-610.

*Primary Examiner*—Robert L. Griffin
*Assistant Examiner*—L. Van Beek
*Attorney, Agent, or Firm*—Hill, Van Santen, Steadman & Simpson

[57] ABSTRACT

A multiplex-demultiplex module having a laser diode and a strip waveguide leading from said laser diode being disposed on a first surface of a substrate and the waveguide extends to an out-coupling and in-coupling location characterized by a single combined grating being arranged on the first surface of the substrate having its grid lines extending perpendicular to the direction of radiation guided in the waveguide and dimensioned so that it will not influence the laser emissions of a first wavelength from the laser diode but will steer radiation supplied from an in-coupling location and having a second wavelength differing from the first wavelength through the substrate onto a photo diode located under the opposite surface of the substrate. The grating thus acts as both a frequency-selective and a diffracting grating and replaces the two gratings in previously known devices.

4 Claims, 1 Drawing Sheet

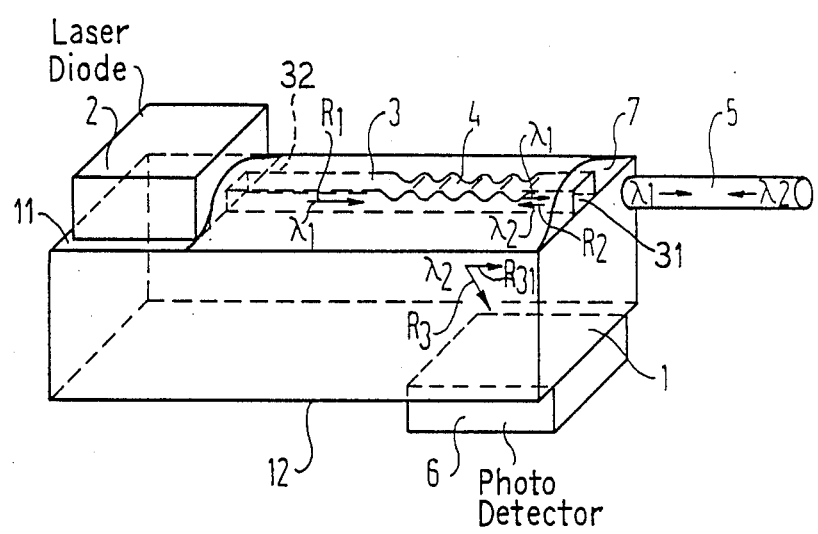

INTEGRATED OPTICAL MULTIPLEX-DEMULTIPLEX MODULE FOR OPTICAL COMMUNICATIONS TRANSMISSION

BACKGROUND OF THE INVENTION

The present invention is directed to an integrated optical multiplex-demultiplex module for bi-directional optical communication transmission. The module includes a laser diode and a strip waveguide for guiding the laser emissions to an out-coupling region being located on one surface of a substrate and a photodetector being arranged on an opposite surface of the substrate. The module has a grating arrangement which is frequency-selective and essentially does not influence the guided laser diode emissions of a first wavelength but it will influence radiation of a second wavelength which is different from the first wavelength which radiation is coupled into the in-coupling location from an external waveguide. The module also has a deflecting diffraction grating having grid lines proceding perpendicular relative to the propagation direction of the radiation in the strip or film waveguide and diffracts and guides the radiation having a second wavelength differing from the laser emissions to the detector on the opposite surface.

A multiplex-demultiplex module or muldex module which has a substrate with a laser diode and a strip waveguide on one surface and a photodetector on an opposite surface with the strip waveguide being provided with a frequency-selective grating for passing the emission of the laser diode and deflecting radiation of a wavelength different from the wavelength of the laser diode which has been coupling into the in-coupling location and having a second deflecting diffraction grating whose grid lines extend perpendicular to the propagation direction in the strip for diffracting the different wavelength onto the photo diode is disclosed in copending U.S. patent application, Ser. No. 812,468, filed Dec. 23, 1985, which U.S. application claims priority from earlier filed European application No. 85111386. In the module disclosed in the above mentioned U.S. application, the grid lines of the frequency-selective diffraction grating proceed obliquely relative to the propagation direction of the radiation guided in the strip waveguide leading from the laser diode to the in-coupling location. A radiation guided in this one waveguide and having a wavelength differing from the wavelength of the laser diode emissions is laterally coupled out of the waveguide by the frequency-selective grating into a second or additional strip waveguide which is arranged on the same side of the substrate and branches off from the one waveguide. The diverting diffraction grating is arranged on this additional waveguide. The grid lines of this second diffraction grating proceed perpendicular to the propagation direction of the radiation conducted in this waveguide. This second diffraction grating steers the radiation onto the photodetector which is the form of a photo diode. In the embodiment of the module, the photo diode is arranged on the side of the substrate lying opposite the one side on which the laser diode and the waveguide with the gratings are arranged. The diverting grating on the second waveguide is dimensioned such that the radiation coupled out by the frequency selective grating and guided in the additional waveguide is steered through the substrate onto the diode.

An integrated optical muldex module, wherein the laser diode, a film waveguide conducting the laser diode emissions to an in-coupling and out-coupling location and a photo diode are arranged on one side of a substrate is disclosed in an article by H. G. Unger, "Planar and Integrated Multi- and Demultiplexers" *Proceedings of the 6th European Conference on Circuit Theory and Design*, 6–8 September 1983, VDE-Verlag, Berlin, pages 387–389. A frequency-selective diffraction grating is arranged on the film or layer waveguide and this grating in contrast to the module of the type initially discussed guides the laser diode emission in the direction towards the out-coupling locations but does not influence a radiation supply from the in-coupling location and having a wavelength differing from the wavelength of the laser diode emission. The grid lines of the frequency-selective grating proceed obliquely relative to the propagation direction of the radiation and are also curved so that the divergent laser diode emission is convergent after the deflection by the grating. The photo diode appears as though they are arranged in the beam path of the radiation not influenced by the frequency-selective grating have a wavelength differing from the wavelength of the laser diode emisssion. The diffraction grating which steers this radiation to the diode does not seem to be present.

SUMMARY OF THE INVENTION

The object of the present invention is to design a muldex module of a species of the initially disclosed manner with a simpler structure.

This is accomplished by an improvement in an integrated optical multiplex-demultiplex module for bi-directional optical communication transmission, said module having a laser diode, a strip first waveguide for guiding a laser diode emission to an out-coupling and in-coupling location being arranged on a surface of a substrate and a photodetector being arranged on the opposite surface of the substrate, a frequency-selective grating being arranged on or in the first waveguide, said frequency-selective grating essentially not influencing the guided laser diode emission but deflects or couples the radiation supplied from the in-coupling location having a wavelength differing from the wavelength of the laser diode emission out of the first waveguide into a second waveguide branching therefrom and a deflecting diffracting grating having grid lines proceeding perpendicular relative to the propagation direction of the radiation of the different waveguides traveling in the additional waveguide being provided on this additional waveguide on the one surface of the substrate and diffracting the radiation through the substrate onto a detector. The improvements are that the frequency-selective grating and the diffracting grating are formed in common by a single grating which is fashioned on or in the first mentioned waveguide leading from the laser diode to the in-coupling location and that the grid lines of this common single grating extend perpendicular to the propagation direction of the radiation in this waveguide.

The module of the invention requires only one strip waveguide and manages with a single grating which assumes the function of both the frequency-selective grating as well as the function of the diffraction grating. The grid lines are straight and proceed perpendicular to the propagation direction of the radiation conducted in the waveguide. This structure simplifies the manufacturing of the grating.

Given a multiplex module under consideration, the radiation-sensitive detectors should be arranged as far as possible from the laser diode. An embodiment of the improvement as the common grating being dimensioned so that a principal direction of radiation supplied from the in-coupling location and diffracted into the substrate by the common grating and having the wavelength differing from the wavelength of the laser diode emission has a component which is directed away from the laser diode.

BRIEF DESCRIPTION OF THE DRAWINGS

The FIGURE is a perspective view of a module in accordance with the present invention.

DESCRIPTION OF THE PREFERRED EMBODIMENTS

The principles of the present invention are particularly useful in the module illustrated in the FIGURE. The module has a substrate with an upper surface or side 11 and a lower surface or side 12. A laser diode 2 and a strip waveguide 3, which extends from the laser diode 2 to an out-coupling and in-coupling location 31 on a straight line, are arranged on the upper surface 11 of the substrate 1 which is of a suitable semi-conductor material, for example, InP. The out-coupling and in-coupling location 31 is established by an end face of the waveguide 3 at a distal end from the laser diode 2.

At this in-coupling, out-coupling location or region 31, the laser diode emissions having, for example, a first wavelength $\lambda_1$ are guided in the waveguide 3 and can be coupled out, for example, into a glass fiber 5. On the other hand, radiation guided in the waveguide or fiber 5 and having a second wavelength $\lambda_2$ differing from the laser diode emissions can be coupled into the waveguide 3 at this location 31.

As illustrated, an optical diffraction grating 4 is arranged on an upper surface 32 of the waveguide 3 and the furrows or ridges 41 of this diffraction grating, which define the grid lines, are oriented perpendicular to the propagation directions $R_1$ and $R_2$ of the radiation guided in the waveguide 3. The grating 4, for example, can be manufactured by etching. It can also be arranged on the underside of the waveguide 3.

The grating 4 is dimensioned so that first, the laser diode emissions emitted by the laser diode 2 is disturbed as little as possible and secondly, the radiation having the wavelength $\lambda_2$ coupled into the strip waveguide 3 from the glass fiber 5, for example, is diffracted in the direction towards the surface or underside of the substrate 1.

A photo diode or detector 6 is arranged on this underside or surface 12 at a point of incidence of the radiation having the wavelength $\lambda_2$, which radiation is diffracted by the grating 4.

In order to produce the greatest possible distance between the laser diode 2 and the photo diode 6, the grating 4 is dimensioned so that the principal direction $R_3$ of the radiation having the wavelength $\lambda_2$ diffracted by it in a direction obliquely down such that it has a horizontal component $R_{31}$, which is parallel to the waveguide 3, that is directed away from the laser diode 2.

For the manufacture of the laser diode 2 and of the strip waveguide 3 with the grating 4, for example, layers of the laser diode of, for example, InGaAsP of different compositions can be applied, for example, by means of suitable combination of epitaxy, masking and etching steps. Actual examples of the process of making the laser diode by these steps are disclosed in the above mentioned copending U.S. application, Ser. No. 812,468. The strip waveguide 3 can also be executed as a strip-loaded film waveguide or as a ribbon waveguide. The laser diode 2 is preferably provided with a distributed feedback.

The strip waveguide 3 and the grating 4 are covered by a passivating layer 7 of, for example, $Si_3N_4$ or InP and are protected by this layer.

The photo diode 6 can be applied by a combination of epitaxy, masking and etching steps. It will have its pn-junction extending parallel to the lower surface 12 of the substrate 1.

Although various minor modifications may be suggested by those versed in the art, it should be understood that I wish to embody with the scope of the patent granted hereon, all such modifications as reasonably and properly come within the scope of my contribution to the art.

I claim:

1. In an integrated optical multiplex-demultiplex module particularly useful for bi-directional optical communication transmissions, said module having a substrate with a laser diode and a strip waveguide for guiding output from the laser diode to an out-coupling region disposed on one surface of the substrate and a photodetector arranged on an opposite surface of the substrate, a frequency-selective grating being arranged in said waveguide and said frequency-selective grating essentially not influencing the guided laser diode emissions traveling in the waveguide to an in-coupling region but deflecting a wavelength different than the wavelength of the laser diode emissions into a second waveguide extending from the first mentioned waveguide and a diffraction grating having grid lines proceeding perpendicular relative to the propagation direction of the radiation of this other wavelength traveling in the second waveguide, said diffraction grating directing the other wavelength onto the photodetector, the improvements comprising said frequency-selective grating and said diffraction grating being formed by a common single grating, which is fashioned on the first waveguide leading from the laser diode to the out-coupling and in-coupling regions, said single grating having grid lines extending perpendicular to the propagation direction of the light in said first waveguide.

2. In an integrated optical multiplex-demultiplex module according to claim 1, wherein said single grating is dimensioned so that the principle direction of the other wavelength, which differs from the wavelength of the laser diode, is suplied from said in-coupling region and is deflected by said single grating into said substrate, has a component extending parallel to the first waveguide directed away from said laser diode.

3. An integrated optical multiplex-demultiplex module for use in bi-directional optical communication transmission, said module having a substrate with a first surface and a second opposite surface, a laser diode emitting emissions of a first wavelength being disposed on said first surface, a waveguide extending from said laser diode to an out-coupling and in-coupling region remote from said laser diode, a photodetector being arranged on the second surface of said substrate, a common grating being disposed on said waveguide, said common grating being a frequency-selective grating essentially not influencing the emissions of the first wavelength from the laser diode traveling in said waveguide to the coupling region and deflecting radiation of a second wavelength differing from said first wavelength, said radiation being coupled at said region into said first waveguide and said common grating also being a diffraction grating for diffracting the radiation of the second wavelength from the waveguide through the substrate to the photo detector, said common grating having grid lines extending perpendicular to the propagation direction of the emissions of the first wavelength and radiation of the second wavelength.

4. An integrated optical multiplex-demultiplex module according to claim 3, wherein said grating is dimensioned so that a principal direction of the diffracted radiation of the second wavelength has a component extending parallel to the first wavelength directed away from said laser diode.

* * * * *